US008600995B1

(12) United States Patent
Satish et al.

(10) Patent No.: US 8,600,995 B1
(45) Date of Patent: Dec. 3, 2013

(54) USER ROLE DETERMINATION BASED ON CONTENT AND APPLICATION CLASSIFICATION

(75) Inventors: Sourabh Satish, Fremont, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/358,396

(22) Filed: Jan. 25, 2012

(51) Int. Cl.
*G06F 17/30* (2006.01)
(52) U.S. Cl.
CPC .............................. *G06F 17/30017* (2013.01)
USPC ....................................................... 707/737
(58) Field of Classification Search
USPC ............... 707/737, 754, 758, 791; 700/48, 49
See application file for complete search history.

(56) References Cited

U.S. PATENT DOCUMENTS

| 5,832,513 | A * | 11/1998 | Kennedy | 1/1 |
| 8,255,993 | B2 * | 8/2012 | Cooley et al. | 726/22 |
| 2010/0017877 | A1 * | 1/2010 | Cooley et al. | 726/22 |

OTHER PUBLICATIONS

Mesnier et al., File classification in self-storage systems, 2004, IEEE, 8 pages.*

* cited by examiner

*Primary Examiner* — Jean B Fleurantin
(74) *Attorney, Agent, or Firm* — Brill Law Office; Jeffrey Brill

(57) ABSTRACT

The role of a user within an organization is automatically determined based on the classification of applications and content on the user's computer. Applications and files installed on a user's computer are identified. Identified applications and files that are not indicative of the role of the user within the organization are filtered out. The non-filtered out applications are functionally classified according to associated roles within the organization, based on predetermined functional classification information. The non-filtered out files are also functionally classified, based on predetermined functional classification information concerning types of files associated with specific organizational roles. The content of files that are of types not indicative of the user's organizational role can be analyzed, and these files can be functionally classified based on their content. The functional classifications are used in determining the role of the user.

20 Claims, 4 Drawing Sheets

USER ROLE DETERMINATION BASED ON CONTENT AND APPLICATION CLASSIFICATION

TECHNICAL FIELD

This disclosure pertains generally to computer user identity management, and more specifically to determining a user's role within an enterprise based on the classification of content and applications.

BACKGROUND

Identifying and keeping track of the role of a user within an enterprise is currently done manually, if at all. For example, the user's role can be tracked by manually entering information concerning the user into a human resources department database, or by manually configuring the user in a functional group in a user or identity management system, such as Active Directory or Lightweight Directory Access Protocol ("LDAP").

Role identification within an enterprise is important for providing users with appropriate levels of access to computer systems and other resources. It is key that users have access to the resources they need to perform their roles in the organization, but that, at the same time, confidential data be secured against access by those who do not need it. For example, financial analysts but not secretaries should have access to confidential financial records, and managers but not interns to confidential employee reviews. Likewise, software developers should be given access to source code under development that it would be desirable to secure against access by members of the organization who are not on the development team.

Manually configuring an identity management system with user role information is burdensome to an organization, and is frequently done inconsistently or not at all. Even where manually configured systems exist, they are often not updated in a timely manner as users change roles within an organization. Thus, it is common for such systems to leave users with inappropriate levels of access to resources.

It would be desirable to address these issues.

SUMMARY

The role of a user within an organization is automatically determined based on the classification of applications and content on the user's computer. Applications and files installed on a user's computer are identified. Identified applications and files that are not indicative of the role of the user within the organization are filtered out. This can include, for example, filtering out applications and file types that tend to be commonly found on the computers of users regardless of their roles within the organization. The non-filtered out applications (both specific applications and types of applications) are functionally classified according to associated roles within the organization, based on predetermined functional classification information. The non-filtered out files are also functionally classified, based on predetermined functional classification information concerning types of files associated with specific organizational roles. The content of files that are of types not indicative of the user's organizational role can be analyzed, and these files can be functionally classified based on their content. The functional classifications are used to determine the role of the user within the organization.

The use of applications and the access of files and external websites can be monitored, and these applications, files and sites can also be functionally classified. These additional functional classifications can be used in determining the role of the user, or to update an existing determination.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
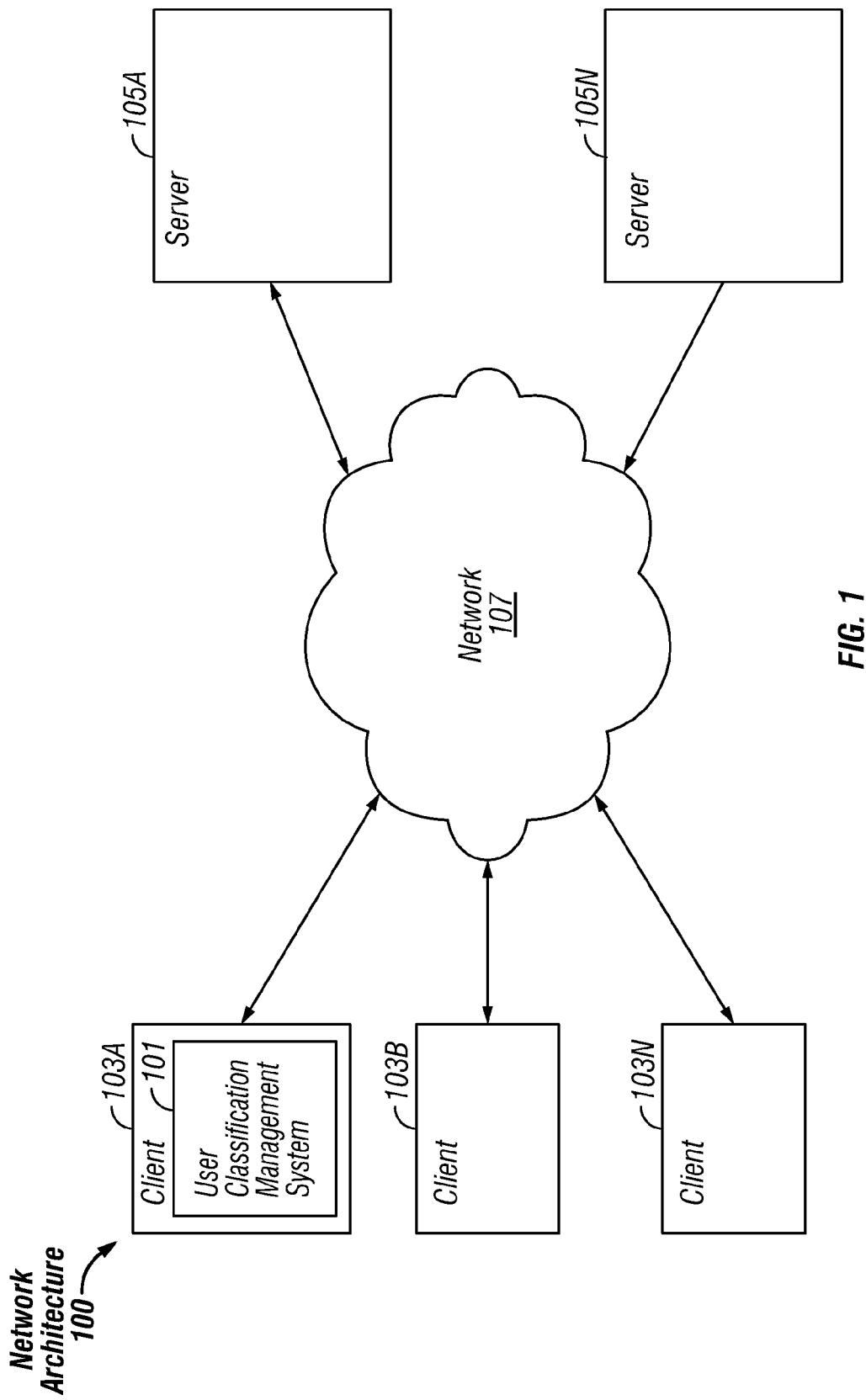
FIG. 1 is a block diagram of an exemplary network architecture in which a user classification management system can be implemented, according to some embodiments.

FIG. 1 is a block diagram illustrating an exemplary network architecture 100 in which a user classification management system 101 can be implemented. The illustrated network architecture 100 comprises multiple clients 103A, 103B and 103N, as well as multiple servers 105A and 105N. In FIG. 1, the user classification management system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
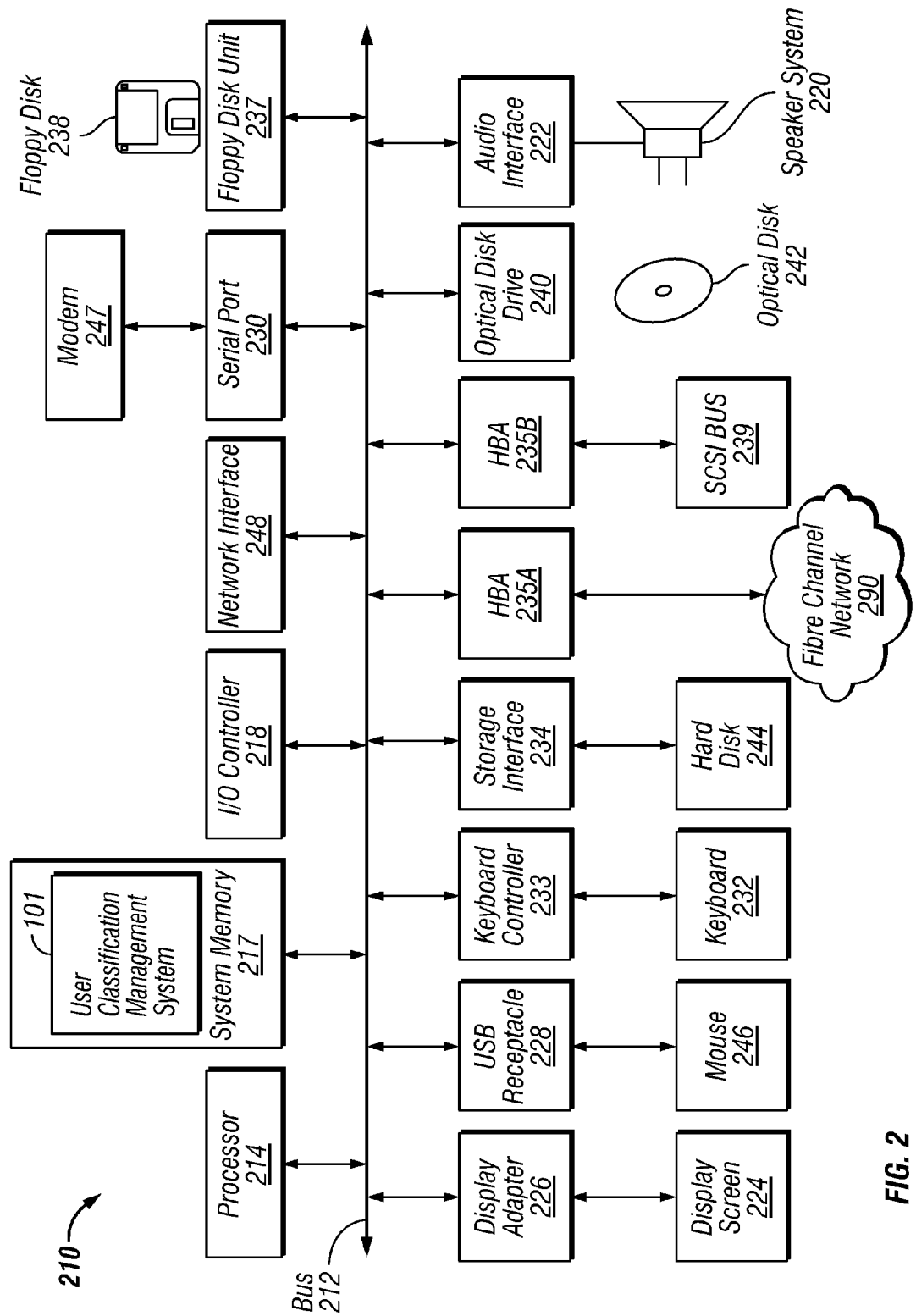
FIG. 2 is a block diagram of a computer system suitable for implementing a user classification management system, according to some embodiments.

FIG. 2 is a block diagram of a computer system 210 suitable for implementing a user classification management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the user classification management system 101 is illustrated as residing in system memory 217. The workings of the user classification management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
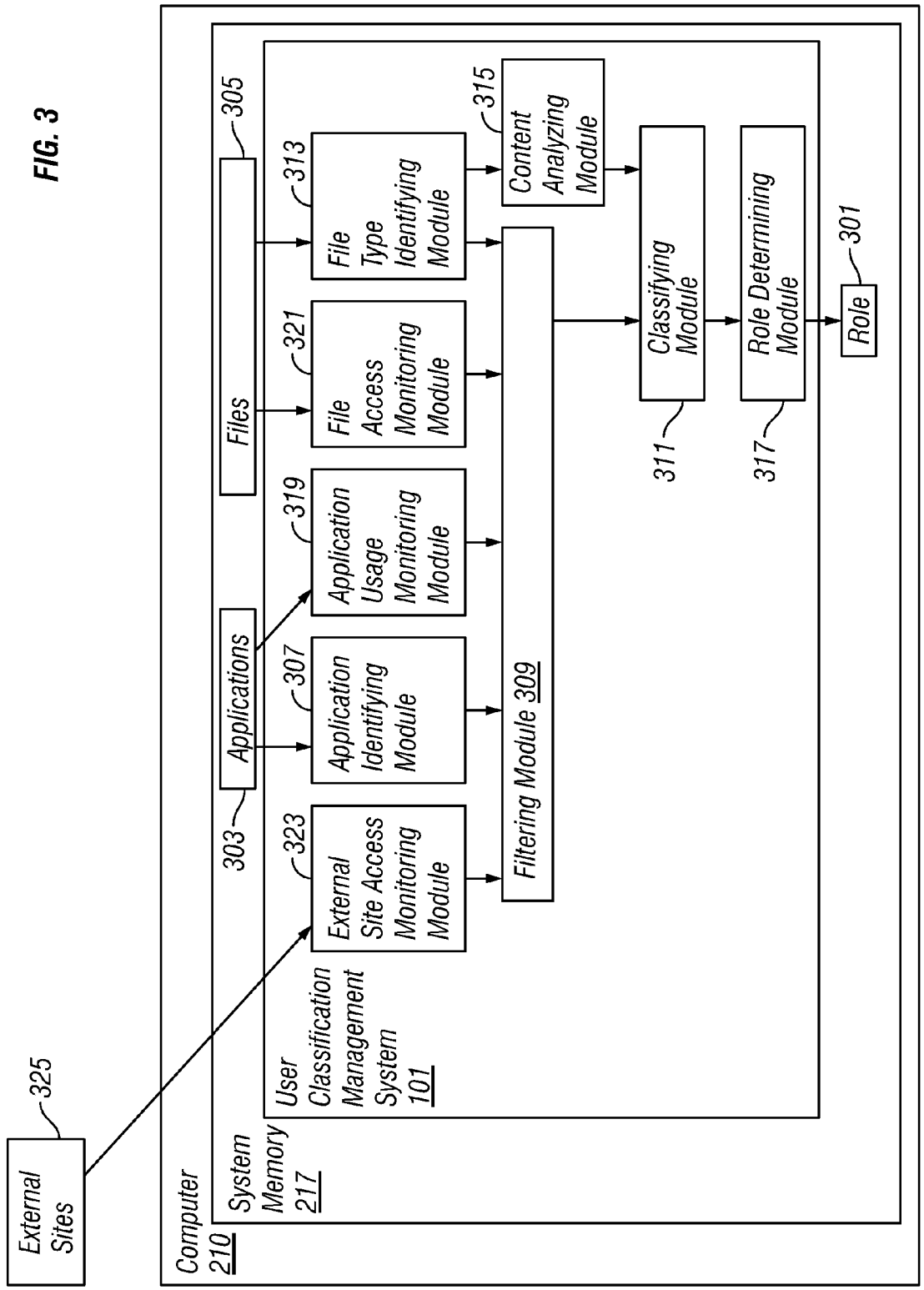
FIG. 3 is a block diagram of the operation of a user classification management system, according to some embodiments.

FIG. 3 illustrates the operation of a user classification management system 101, according to some embodiments. As described above, the functionalities of the user classification management system 101 can reside on a client 103, a server 105, or be distributed between multiple computer systems 210, including within a cloud-based computing environment in which the functionality of the user classification management system 101 is provided as a service over a network 107. It is to be understood that although the user classification management system 101 is illustrated in FIG. 3 as a single entity, the illustrated user classification management system 101 represents a collection of functionalities, which can be instantiated as a single or multiple modules as desired (an instantiation of specific, multiple modules of the user classification management system 101 is illustrated in FIG. 3). It is to be understood that the modules of the user classification management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the user classification management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, the user classification management system 101 can determine a user's role 301 within an enterprise based on installed applications 303 and files 305 (both file types and/or file content) on the user's computer 210. To do so, an application identifying module 307 of the user classification management system 101 examines the user's computer 210, and identifies specific installed applications 303. In different embodiments, the application identifying module 307 can identify installed applications 303 in different ways. For example, installed applications 303 can be identified through the operating system (e.g., by reading the registry) or by examining existing folders and files therein.

As described in more detail below, the presence of specific applications 303 and application 303 types can be indicative of the role 301 of the user. For example, only a software developer is likely to have certain development tools installed such as a compiler, whereas only a lawyer is likely to have automated legal research tools such as federal court case libraries. In order to facilitate such classification, the application identifying module 307 identifies the applications 303 installed on the user's computer 210.

A filtering module 309 of the user classification management system 101 performs data analysis to filter out applications 303 that are commonly found on all computers 210 in an enterprise, regardless of the role 301 of the user. For example, some applications 303, such as a web browser, are automatically installed as part of a standard configuration on all computers 210 running a given operating system. Other applications 303 are installed on all computers 210 within a given enterprise by an administrator, such as, for example, a given word processor, spreadsheet application and/or anti-virus package. The presence of such applications 303 does not provide any useful information as to a user's role 301 within an organization, because all users have them installed.

The filtering module 309 can use enterprise specific information concerning which applications 303 are universally deployed across the organization, or use a data driven list of common applications 303 that should be filtered generally when determining user roles 301. In either case, the filtered applications 303 are not included in the analysis to determine a user's role 301 in the organization based on installed applications 303.

A classifying module 311 of the user classification management system 101 uses predetermined functional classification information to classify the non-filtered applications 303 according to associated user roles 301. More specifically, applications 303 can be grouped into classes such as "IT Administrator," "Developer," "Clerical," "Financial," "Legal," etc., based on functional classification information specifying what organizational roles 301 tend to be performed by users who have specific applications 303 and specific application 303 types installed on their computers 210. In other words, because the non-filtered applications 303 on a user's computer 210 are indicative of the user's role 301 within the organization, they are assigned to classes based on information indicating the types of users (i.e., users in specific organizational roles 301) that tend to use these applications 303 or application 303 types. In some embodiments, some or all of these classes and/or the corresponding functional classification information are enterprise specific, whereas in other embodiments the classifications can be general across different enterprises.

A file type identifying module 313 of the user classification management system 101 can examine the file system of the user's computer 210, and identify specific types of files 305 present on the user's computer 210. Although many types of files 305 are likely to be present on the computers of all users within an organization, regardless of role 301, the presence of other file types can be useful in identifying such roles 301. For example, all users are likely to have word processing files (e.g., .doc files) and image files (e.g., .jpg files). However, only developers are likely to have source code files (e.g., files with the extension .c, .cpp, .h.), make files (.mak) and the like. As with the processing of applications 303, the filtering module 309 can filter out types of files 305 that are not indicative of specific organizational roles 301. The classifying module 311 can group the non-filtered files 305 into classes indicating the user's role 301 based on predetermined functional classification information specifying what types of users tend to have these types of files 305 on their computers 210 (e.g., "Financial", "Technical", "Legal", etc.).

Although in some cases file types can be reliably indicative of a user's organizational role 301, as explained above many file types (e.g., .doc, .docx, .xlsx) are likely to be present on user's computers 210 regardless of the user's role 301. In such cases, a content analyzing module 315 of the user classification management system 101 can analyze the content to group the files 305 into specific classes indicative of the user's role 301. In different embodiments, the content analyzing module 315 employs different functionalities to perform the content analysis, such as identifying specific keywords indicative of given classifications, ranking keywords, weighing keywords, etc.

A role determining module 317 of the user classification management system 101 uses the functional classifications of the applications 303, types of files 305 and/or file content on the user's computer 210 to determine the role 301 of the user within the enterprise. The specific implementation for mapping classifications to user roles 301 can vary between embodiments. For example, an ontology map, administrator specified rules, or a combination of both can be utilized. Such mappings can but need not be enterprise specific. Additionally, the mapping can be as detailed or general as desired.

For example, in one embodiment a general set of rules could dictate that any users with at least ten items (applications 303, file types, and/or file content in any combination) of type "DEVELOPER" are to be classified as developers. In another embodiment, rules for a specific enterprise could dictate that only users with three specific applications 303 (e.g., a source code editor, a compiler and a source code control system) and more source code type files 303 than word processing documents are to be so classified. It is to be understood that which specific classifications are to be made based the specific applications 303 and application types and/or files 305 and file types found on computers 210 in given combinations is a variable design parameter.

The usage of applications 303 can also be taken into account in the determination of a user's role 301. For example, in one embodiment an application usage monitoring module 319 of the user classification management system 101 gathers "most recently used" information. The application usage monitoring module 319 can glean information indicating the mostly recently used applications 303 from operating system repositories such as event logs, pre-fetch data, or the registry. Information concerning which applications 303 (and/or which types of applications 303) were used most recently can be used by the role determining module 317 in determining the role 301 of the user. For example, applications 303 used recently could be given more weight in making this determination than applications 303 which are installed on the user's computer 210 but have not been recently used. Different standards of "recent" can be employed in different embodiments as desired (e.g., last n applications used, applications used within last n days, different weights assigned to different values for n, etc.).

In one embodiment, the application usage monitoring module 319 monitors the usage of applications 303 in real time. The role determining module 317 can update its assignment of roles 301 to users, based on which applications 303 and application types are actually used, as well as how frequently and for how long. This dynamic application usage information can be more indicative of a user's role 301 than a static picture of which applications 303 the user has installed, because applications 303 can be installed without being frequently (or ever) used. For example, if a given user has recently used or frequently uses developer tools such as a source code editor and a compiler, the user is likely an active developer, whereas a user in a non-developer role 301 (e.g., sales person, manager) could have these applications 303 installed but not use them, either because the user is operating a computer 210 formerly used by another, or because the user's role 301 within the enterprise has changed.

In a manner similar to application 303 usage monitoring, in one embodiment a file access monitoring module 321 of the user classification management system 101 monitors the user's access of specific files 305, and this information is taken into account in the determination of the user's role 301. As with application 303 usage, the file access monitoring module 321 can glean most recently accessed information as well as dynamic file access information.

An external site access monitoring module 323 of the user classification management system 101 can monitor the user's access of websites 325 (both intranet and Internet). As more functionality and data become cloud based, access of websites 325 can become increasingly relevant in the determination of a user's role 301. The filtering module 309 can filter out specific sites 325 and types of sites 325 that are not indicative of specific organizational roles 301, such as the organization's home page, or popular search engines. The classifying module 311 can group the non-filtered sites 325 accessed by the user into classes indicating the user's role 301 based on predetermined functional classification information. For example, a sales person is more likely to access the enterprise's intranet based sales site 325, whereas a lawyer is more likely to access web based legal research sites 325. The role determining module 317 can use this site access data to assign or update the assignment of roles 301 to users.

In some embodiments, all of the functionality of the user classification management system 101 is implemented on the user's computer 210, whereas in other embodiments, data gathered on the user's computer 210 is transmitted to a server side backend for analysis and processing. How much and which aspects of the functionality of the user classification management system 101 to implement on the client and server sides respectively is a design decision which can vary between embodiments as desired.

The user classification management system 101 can be helpful in many scenarios. A user's role 301 can be automatically determined, and used to control or tailor the user's access to system resources, as well as to automatically populate a database, or a user or identity management system within the enterprise. Changes in user roles 301 can also be detected dynamically, and used to automatically keep such systems, as well as associated policies, access rights, and settings, current. For example, a user who's primary role 301 is technical may play an expanded role in a given project, such as a merger or acquisition. In that capacity, the user may also play, for example, financial, business development, and legal roles 301.

Figure 4:
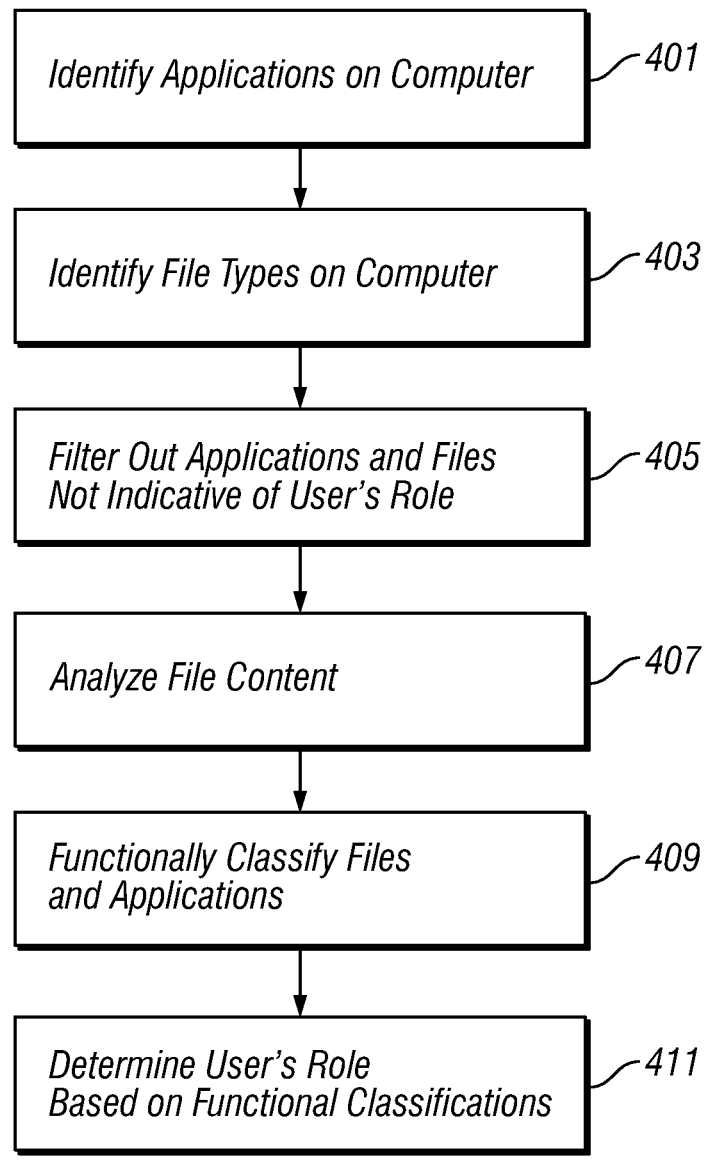
FIG. 4 is a flowchart of the operation of a user classification management system, according to some embodiments.

FIG. 4 illustrates steps of the operation of the user classification management system 101, according to some embodiments. The application identifying module 307 identifies 401 applications 303 installed on the user's computer 210. The file type identifying module 313 identifies 403 specific types of files 305 present on the user's computer 210. The filtering module 309 filters out 405 identified applications 303 and identified files 305 that are not indicative of the role 301 of the user within the organization. The content analyzing module 315 analyzes 407 the content of files 305 that are of types not indicative of the user's organizational role 301. The classifying module 311 functionally classifies 409 applications and files according to associated roles within the organization, based on predetermined functional classification information. The role determining module 317 determines 411 the role 301 of the user within the organization, based on the functional classifications.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically determining a role of a user within an organization based on classification of applications and content, the method comprising the steps, executed by at least one processor, of:
   identifying applications and files installed on a user's computer;
   filtering out identified applications and identified files that are not indicative of the role of the user within the organization;
   functionally classifying non-filtered out identified applications and files according to associated roles within the organization, based on predetermined functional classification information;
   functionally classifying at least one specific identified type of file installed on the user's computer as being indicative of a specific role of the user within the organization;
   determining the role of the user within the organization based on at least the functional classification of the non-filtered out identified applications and files; and
   utilizing the functional classification of the at least one file based on the specific identified file type in the determining of the role of the user within the organization.

2. The method of claim 1 further comprising:
   functionally classifying at least one specific identified application installed on the user's computer as being indicative of a specific role of the user within the organization.

3. The method of claim 1 further comprising:
   functionally classifying at least one specific identified type of application installed on the user's computer as being indicative of a specific role of the user within the organization.

4. The method of claim 1 further comprising:
   analyzing content of at least one file installed on the user's computer;
   functionally classifying the at least one file as being indicative of a specific role of the user within the organization, based on the analyzed content; and
   utilizing the functional classification of the at least one file based on the analyzed content in the determining of the role of the user within the organization.

5. The method of claim 4 wherein analyzing content of at least one file installed on the user's computer further comprises:
   analyzing content of at least one file installed on the user's computer, the at least one file having been filtered out as not indicative of the role of the user within the organization.

6. The method of claim 1 further comprising:
   gleaning information identifying most recently used applications and most recently accessed files on the user's computer;
   filtering out identified most recently used applications and most recently accessed files that are not indicative of the role of the user within the organization;
   functionally classifying the non-filtered out most recently used applications and most recently accessed files as being indicative of a specific role of the user within the organization; and
   utilizing the functional classification of the non-filtered out most recently used applications and most recently accessed files on the user's computer in the determining of the role of the user within the organization.

7. The method of claim 1 further comprising:
   monitoring usage of applications by the user of the computer in real time;
   monitoring access of files by the user of the computer in real time;
   filtering out monitored used applications and monitored accessed files that are not indicative of the role of the user within the organization;
   functionally classifying the non-filtered out monitored used applications and monitored accessed files as being indicative of a specific role of the user within the organization; and updating the determination of the role of the user within the organization, based on the functional classification of the non-filtered out monitored used applications and monitored accessed files.

8. The method of claim 1 further comprising:
gleaning information identifying external sites most recently accessed by the user's computer;
filtering out identified most recently accessed external sites that are not indicative of the role of the user within the organization;
functionally classifying the non-filtered out most recently accessed external sites as being indicative of a specific role of the user within the organization; and
utilizing the functional classification of the non-filtered out most recently accessed external sites in the determining of the role of the user within the organization.

9. The method of claim 1 further comprising:
monitoring access of external sites by the user of the computer in real time;
filtering out monitored accessed external sites that are not indicative of the role of the user within the organization;
functionally classifying the non-filtered out monitored accessed external sites as being indicative of a specific role of the user within the organization; and
updating the determination of the role of the user within the organization, based on the functional classification of the non-filtered out monitored accessed external sites.

10. At least one non-transitory computer readable medium storing program code that, when loaded into computer memory and run by a processor, executes the following steps for automatically determining a role of a user within an organization based on classification of applications and content:
identifying applications and files installed on a user's computer;
filtering out identified applications and identified files that are not indicative of the role of the user within the organization;
functionally classifying non-filtered out identified applications and files according to associated roles within the organization, based on predetermined functional classification information;
functionally classifying at least one specific identified type of file installed on the user's computer as being indicative of a specific role of the user within the organization;
determining the role of the user within the organization based on at least the functional classification of the non-filtered out identified applications and files; and
utilizing the functional classification of the at least one file based on the specific identified file type in the determining of the role of the user within the organization.

11. The at least one non-transitory computer readable medium method of claim 10 further comprising:
functionally classifying at least one specific identified application installed on the user's computer as being indicative of a specific role of the user within the organization.

12. The at least one non-transitory computer readable medium method of claim 10 further comprising:
functionally classifying at least one specific identified type of application installed on the user's computer as being indicative of a specific role of the user within the organization.

13. The at least one non-transitory computer readable medium method of claim 10 further comprising:
analyzing content of at least one file installed on the user's computer;
functionally classifying the at least one file as being indicative of a specific role of the user within the organization, based on the analyzed content; and
utilizing the functional classification of the at least one file based on the analyzed content in the determining of the role of the user within the organization.

14. The at least one non-transitory computer readable medium method of claim 13 wherein analyzing content of at least one file installed on the user's computer further comprises:
analyzing content of at least one file installed on the user's computer, the at least one file having been filtered out as not indicative of the role of the user within the organization.

15. The at least one non-transitory computer readable medium method of claim 10 further comprising:
gleaning information identifying most recently used applications and most recently accessed files on the user's computer;
filtering out identified most recently used applications and most recently accessed files that are not indicative of the role of the user within the organization;
functionally classifying the non-filtered out most recently used applications and most recently accessed files as being indicative of a specific role of the user within the organization; and
utilizing the functional classification of the non-filtered out most recently used applications and most recently accessed files on the user's computer in the determining of the role of the user within the organization.

16. The at least one non-transitory computer readable medium method of claim 10 further comprising:
monitoring usage of applications by the user of the computer in real time;
monitoring access of files by the user of the computer in real time;
filtering out monitored used applications and monitored accessed files that are not indicative of the role of the user within the organization;
functionally classifying the non-filtered out monitored used applications and monitored accessed files as being indicative of a specific role of the user within the organization; and
updating the determination of the role of the user within the organization, based on the functional classification of the non-filtered out monitored used applications and monitored accessed files.

17. The at least one non-transitory computer readable medium method of claim 10 further comprising:
monitoring access of external sites by the user of the computer in real time;
filtering out monitored accessed external sites that are not indicative of the role of the user within the organization;
functionally classifying the non-filtered out monitored accessed external sites as being indicative of a specific role of the user within the organization; and
updating the determination of the role of the user within the organization, based on the functional classification of the non-filtered out monitored accessed external sites.

18. A computer system for automatically determining a role of a user within an organization based on classification of applications and content, the computer system comprising:
a memory;
a processor;

an application identifying module residing in the memory, the application identifying module being configured for identifying applications and files installed on a user's computer;

a filtering module residing in the memory, the filtering module being configured for filtering out identified applications and identified files that are not indicative of the role of the user within the organization;

a classifying module residing in the memory, the classifying module being configured for functionally classifying non-filtered out identified applications and files according to associated roles within the organization, based on predetermined functional classification information, and for functionally classifying at least one specific identified type of file installed on the user's computer as being indicative of a specific role of the user within the organization; and a role determining module residing in the memory, the role determining module being configured for determining the role of the user within the organization based on at least the functional classification of the non-filtered out identified applications and files, and for utilizing the functional classification of the at least one file based on the specific identified file type in the determining of the role of the user within the organization.

19. The computer system of claim 18 wherein the classifying module is further configured for:

functionally classifying at least one specific identified application installed on the user's computer as being indicative of a specific role of the user within the organization.

20. The computer system of claim 18 wherein the classifying module is further configured for:

functionally classifying at least one specific identified type of application installed on the user's computer as being indicative of a specific role of the user within the organization.

* * * * *